US 6,726,188 B2

(12) United States Patent
Dichtl et al.

(10) Patent No.: US 6,726,188 B2
(45) Date of Patent: Apr. 27, 2004

(54) STRUCTURED MASS TRANSFER PACKING WITH IMPROVED BAFFLES

(75) Inventors: Gottfried Dichtl, Nieder-Olm (DE); Steffen Dietl, Hackenheim (DE)

(73) Assignee: QVF Engineering GmbH, Mainz (DE)

( * ) Notice: Subject to any disclaimer, the term of this patent is extended or adjusted under 35 U.S.C. 154(b) by 61 days.

(21) Appl. No.: 10/139,608

(22) Filed: May 3, 2002

(65) Prior Publication Data

US 2002/0167094 A1 Nov. 14, 2002

(30) Foreign Application Priority Data

May 8, 2001 (DE) ......................................... 101 22 189

(51) Int. Cl.[7] ................................................. B01F 3/04
(52) U.S. Cl. ......................................... 261/97; 261/110
(58) Field of Search ..................... 261/97, 110, DIG. 85

(56) References Cited

U.S. PATENT DOCUMENTS

| 4,369,150 A | * | 1/1983 | Harper ......................... 261/97 |
| 4,842,778 A | * | 6/1989 | Chen et al. .................... 261/97 |
| 5,224,351 A | | 7/1993 | Jeannot et al. |
| 5,585,046 A | * | 12/1996 | Jansen et al. ................. 261/97 |
| 5,632,962 A | * | 5/1997 | Baker et al. ................ 422/211 |

FOREIGN PATENT DOCUMENTS

| EP | 0 867 220 A | 9/1998 |
| EP | 0 997 189 A | 5/2000 |

OTHER PUBLICATIONS

Patent Abstracts of Japan, vol. 1999. No. 09 of Jul. 30, 1999.

* cited by examiner

*Primary Examiner*—Scott Bushey
(74) *Attorney, Agent, or Firm*—Henry M. Feiereisen

(57) ABSTRACT

A packing for a mass transfer column for absorption, desorption, rectification or extraction processes, includes a packing bed having a packing element, a tubular shrink film shrunk onto at least a portion of a periphery of the packing element, and a baffle arranged at the periphery of the packing element to prevent a wall effect in the column. The baffle has a conical edge which extends outwardly with respect to the shrink film and is made of plastic.

16 Claims, 2 Drawing Sheets

STRUCTURED MASS TRANSFER PACKING WITH IMPROVED BAFFLES

CROSS-REFERENCES TO RELATED APPLICATIONS

This application claims the priority of German Patent Application Serial No. 101 22 189.4, filed May 8, 2001, pursuant to 35 U.S.C. 119(a)–(d), the subject matter of which is incorporated herein by reference.

BACKGROUND OF THE INVENTION

The present invention relates, in general, to structured mass transfer packings.

It is generally known to use so-called structured packings in columns for implementing a mass transfer between two fluid phases. Examples of such columns include columns for absorption, desorption, rectification or extraction. The packing is comprised of packing elements arranged on top of each other in various packing beds zones of the column. The packing elements may be configured as single packing elements that match and substantially fill the column cross section, or, especially when the columns have greater inner width, may be composed of single segments which are then combined to a packing element, e.g., like pieces of a cake.

There are various designs of structured mass transfer packings which can also be made of different materials. Packings are known which are made of glass, e.g., packings made through joining corrugated glass plates, as described in German Pat. Nos. 39 09 995 C1 and DE 41 28 675 C2. Packings of this type are sold under the DURAPACK® brand name, with their structure and application disclosed in brochures for such DURAPACK® packings.

Packing materials other than glass have also been described in German Pat. No. DE 41 28 675 C2.

Packing elements of such structured mass transfer packings are arranged on top of one another in packing bed zones in the column cross section. An excessive overall own weight can be prevented by using ring supports or carrier frames. Hereby, it is strived to fill the column cross sections as completely as possible. The formation of more or less distinct marginal gaps is, however, unavoidable between the periphery of the packing elements and the column wall, so that the liquid phase will partially flow downwards along the inner wall surface of the column during the mass transfer process in the column and thus does not sufficiently participate in the mass transfer. This maldistribution, also called wall effect, deteriorates the desired mass transfer efficiency of the column. The marginal gaps may hereby have very different widths ranging from fractions of millimeters up to several millimeters.

One approach to counter the wall effect involves the provision of distribution elements or baffles, also called wall wipers which are typically implemented as upwardly expanding conical or funnel-shaped rings which extend directly up to the inner wall of the column and return the liquid phase fraction flowing downwardly along the inner column wall back to the interior of the packing elements.

Attachment of such baffles to the packings is implemented to date predominantly through placement of preformed, annular baffles of PTFE or other appropriate plastic between the packing elements. This approach suffers shortcomings because the rings, disposed between the individual packing elements, reduce the flow cross section between the packing elements at these locations and tensions are typically experienced during installation of the packing elements, resulting in a distortion of the annular baffle and thus the slanted edge thereof to assume a corrugated configuration, so that the baffle is prevented from evenly abutting against the inner column wall. As a consequence, the gap sealing action is poor and liquid can collect in formed valleys of the baffle.

Another approach involves the attachment of baffles to the packings in such a way that a slanted film of PTFE or other plastic is secured to the edge of the packing by sewing a vertical portion of the film with a second PTFE ring or plastic ring wrapped about the packing. This approach is, however, cumbersome.

It would therefore be desirable and advantageous to provide an improved mass transfer packing which obviates prior art shortcomings and allows easy attachment of baffles while still attaining a reliable operation of the baffles.

SUMMARY OF THE INVENTION

According to one aspect of the present invention, a packing for a mass transfer column, includes a packing bed having a packing element; a tubular shrink film shrunk onto at least a portion of a periphery of the packing element; and a baffle arranged at the periphery of the packing element to prevent a wall effect in the column, with the baffle having a conical edge which extends outwardly with respect to the shrink film and is made of plastic.

The packing element of the packing bed may be a single-piece packing element or a packing element comprised of individual segments that are combined to form the packing element.

According to another feature of the present invention, the conical edge of the baffle may be formed by at least a part of an upper rim of the shrink film. As an alternative, the baffle is made by a film strip placed onto the packing element and having an upper rim bent at least in part outwards with respect to the periphery of the packing element to form the conical edge, wherein the film strip is held in abutment with the packing element by the shrink film. The bent part of the upper rim of the shrink film may be slitted. Likewise, the bent part of the upper rim of the film strip may be slitted.

According to another feature of the present invention, the film strip may be a strip of a heat-resistant plastic film, e.g., of polytetrafluoroethylene (PTFE film). The film strip may also be a strip of an extruded film band with the upper rim being angled. The angled upper rim of the film band and a remaining portion of the film band define an angle between 110 and 160°, preferably 135°, wherein the angled upper rim defines about 20 to about 40% of an overall width of the film band.

According to another feature of the present invention, the shrink film may be made of tetrafluoroethylene copolymer, e.g., of fluorinated ethylene propylene (FEP).

According to another aspect of the present invention, a film band of PTFE having an angled upper edge bent at an angle of about 135°, is used for making a baffle for a packing of a mass transfer column.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
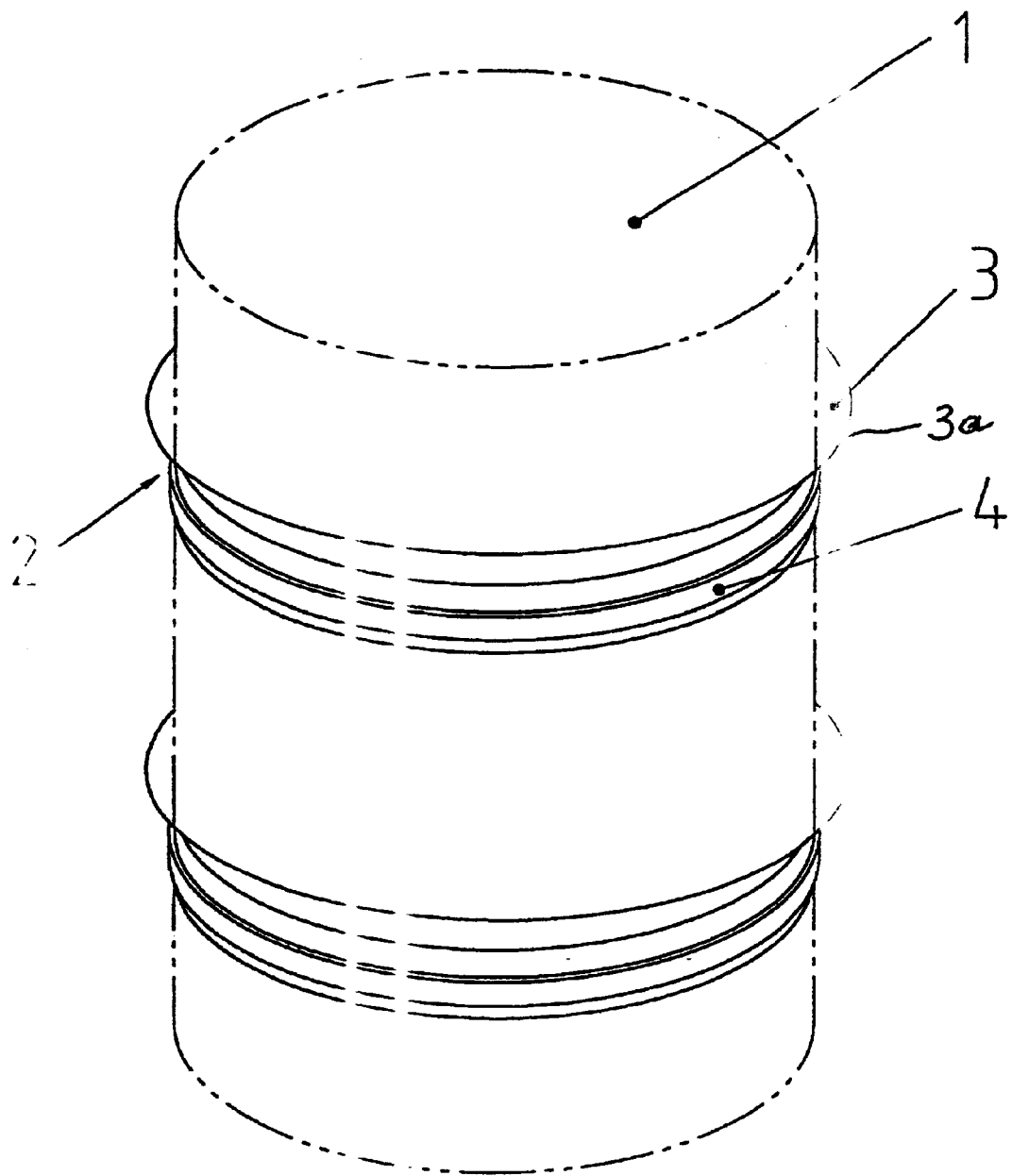
FIG. 1 is a schematic perspective view of a packing element according to the present invention.

Throughout all the Figures, same or corresponding elements are generally indicated by same reference numerals.

Turning now to the drawing, and in particular to FIG. 1, there is shown a schematic perspective view of a packing element 1 according to the present invention as part of a packing bed for a mass transfer column, not shown. Although not shown in detail, the packing bed has a plurality of such packing elements 1 arranged on top of one another. A fluid is fed into the column and trickles downwards through the packing bed until exiting a fluid outlet. Structure and operation of columns, involved here, are generally known to the artisan so that a detailed description thereof is omitted for the sake of simplicity.

The packing element 1 may have a single-piece configuration or may be composed of several segments put together to form the packing element 1 and includes a wall wiper or baffle, generally designated by reference numeral 2. The baffle 2 is comprised of a film strip or film band 3, wrapped around the packing element 1, and a ring of shrink film 4, which is shrunk onto the packing element 1 and provided to hold the film strip 3 in place. The film strip 3 has an upper rim 3a which is angled outwardly in the direction of the, not shown, inner column wall, whereby the film strip 3 is held in abutment with the surface of the packing element 1 by the shrink film 4.

As an alternative, the upper rim 3a, having an upwardly open conical configuration, may, of course, be realized directly by an upper rim of the shrink film 4.

The film strip 3 of the baffle 2 should be made of plastic material which is chemically inert and has sufficiently stable shape under the conditions prevailing inside the column during the mass transfer processes. In other words, the film strip 3 should therefore be made of sufficiently heat-resistant plastic material, for example, polytetrafluoroethylene (PTFE). Likewise, the shrink film 4 should be made of plastic material which is sufficiently inert and has enough strength and stable shape under the conditions prevailing inside the column during the mass transfer processes. Suitable materials are certain fluoroplastics, such as tetrafluoroethylene-copolymers. Currently preferred is the use of tetrafluoroethylene-hexafluoropropylene copolymers (FEP). So long as plastic tubes are available of sufficient width, sections of such plastic tubes can loosely be placed over the packing elements 1 and then shrunk on. Apart from holding the baffle 2 in place, or by itself forming the upper rim 3a of the baffle 2, the plastic tube, i.e. shrink film 4, also holds the packing element 1 or segments of the packing element together to thereby stabilize the packing bed.

In order to prevent tension in the peripheral area and irregularities as a result of distortions, and in order to better suit the packing element 1 to varying column diameters, the conical rim 3a of the baffle 2 may be slitted, i.e. may have radial incisions or notches.

When making the baffles of strip-shaped material, it may be suitable to provide the film strip 3 with a score line in longitudinal direction or, optionally, with a fold in longitudinal direction, to facilitate a bending of the upper rim 3a of the film strip 3. Taking into account the ring-shaped disposition, the film strip 3 may suitably be provided with incisions or notches in the portion being angled for formation of the baffle 2. Film strips or film band 3, involved here, can advantageously be made through extrusion with an appropriate nozzle configuration.

Figure 2:
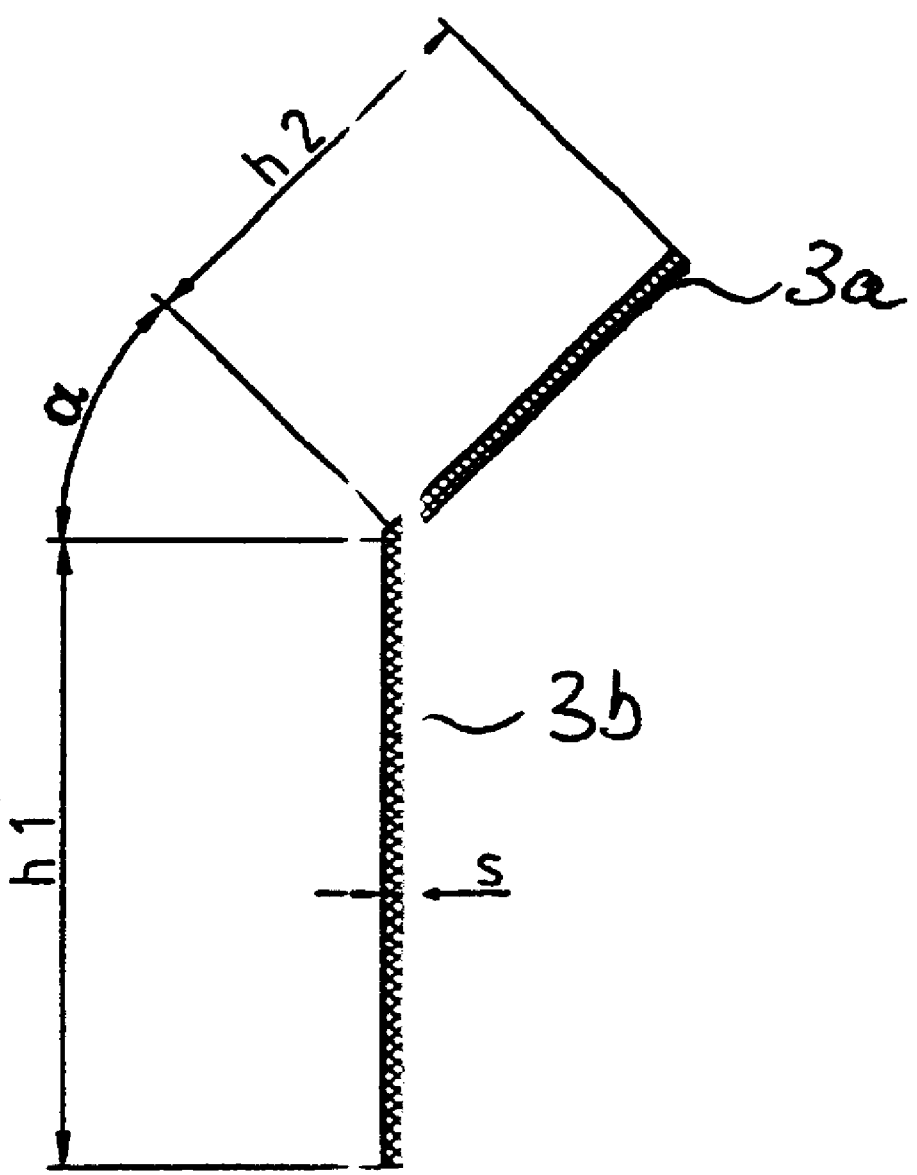
FIG. 2 is a cross sectional view of a film strip for use as baffle for the packing element of FIG. 1.

FIG. 2 shows a cross sectional view of the film strip 3 for use as baffle 2 for the packing element 1. The film strip 3 has a width s and is divided in longitudinal direction as to provide the angled upper rim 3a of a height h2, bent outwardly at an angle between 110° and 160°, preferably about 135° with respect to a remaining portion 3b of height h1, of the film strip 3. This angle corresponds to an angle $\alpha$ of 20° to 70°, preferably 45°, by which the funnel-shaped rim 3a is bent outwards. The "funnel angle" $\alpha$ is established identically in the disposition shown in FIG. 1. The upper rim 3a of the film strip 3 forms about 20 to about 40% of the overall width of the film strip 3, i.e. 20 to 40% of h1 plus h2. Of course, the angled rim 3a may be shortened through cutting in longitudinal direction before installation of the film strip 3 to best suit the film strip 3 to prevailing conditions, i.e. narrower or wider peripheral gaps.

An essential feature of the present invention is the securement of the baffle 2 to the packing element 1 through shrinkage of the tubular or ring-shaped shrink film 4.

In case the packing bed is made of single, cylindrical packing elements 1, the shrink film 4 is shrunk over the single packing element 1 in a ring-shaped manner, whereby two baffles 2 are provided per packing element to better compensate for changing tolerances of the column and the packing element. In case the packing element is composed of single segments, it is also possible to attach the shrink film 4 about the individual segments and to provide baffles only on those portions which are directed to the inner column wall at the periphery of the finished packing, whereby the baffles are formed by bending the shrink film 4 only in this region outwards or to arrange only in this region film strips 3 which are bent outwards.

The tubular ring for providing the shrink film 4 may also be formed from an endless band, in the event no tube of a shrink film of suitable diameter is available, whereby a section is then shaped into a ring with required diameter, with the confronting ends of the ring being joined, e.g., through welding.

The attachment of the baffles 2 to the periphery of the packing elements 2 by means of rings of shrink film 4 does not impact the free cross section of the packing. At the same time, the shrink film 4 provides integrity of the packing elements 1 so that the need for additional devices is omitted. Overall cost for packing elements according to the invention is considerably reduced as a consequence of the absence of additional devices and the simplicity of securement. Moreover, the band-shaped or strip-shaped baffles can be made cost-efficiently as endless band and suited to a wide variety of column diameters through simple cutting to size.

The baffles 2 can be made by a process which involves placement of a band of angled film strip onto the periphery of a packing element and subsequent pushing of a tubular portion over the packing element in such a way that the tubular portion bears against the essentially cylindrical annular edge of the film strip to define a loose connection. Thereafter, the loose connection is heated to shrink the tubular portion and thereby realize a secure attachment of the baffle 2 on the packing element 1.

In the event, the baffle 2 is formed solely by a shrink film 4, e.g., made of FEP, which then provides with its angled upper rim 3a the film strip 3, the process to make the baffle 2 involves cutting of the shrinkable tube in portions of a height of, e.g., 40 mm, and then loosely placing the formed tubular ring over the packing element. The upper rim of the tubular ring, forming the later baffle, is then folded downwards. During subsequent shrinkage operation in a furnace, the downwardly bent rim also shrinks onto the packing element at formation of a double ring layer. The downwardly bent rim is then slitted and folded upwards for formation of the baffle.

Also this embodiment has many advantages: the free cross section of the packing is not impacted, the shrunk-on shrink film holds the packing together, without need for additional devices, and a simple and cost-efficient installation is possible.

While the invention has been illustrated and described as embodied in a structured mass transfer packing with improved baffles, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A packing for a mass transfer column, comprising:
   a packing bed including a packing element;
   a tubular shrink film shrunk onto at least a portion of a periphery of the packing element; and
   a baffle arranged at the periphery of the packing element to prevent a wall effect in the column, said baffle having a conical edge which extends outwardly with respect to the shrink film and is made of plastic.

2. The packing of claim 1, wherein the packing element is a single-piece packing element.

3. The packing of claim 1, wherein the packing element is comprised of individual segments.

4. The packing of claim 1, wherein the shrink film is wrapped about the packing element.

5. The packing of claim 3 wherein the shrink film is wrapped about a said individual segment.

6. The packing of claim 1, wherein the conical edge of the baffle is formed by at least a part of an upper rim of the shrink film.

7. The packing of claim 1, wherein the baffle is made by a film strip placed onto the packing element and having an upper rim bent at least in part outwards with respect to the periphery of the packing element to form the conical edge, wherein the film strip is held in abutment with the packing element by the shrink film.

8. The packing of claim 6, wherein the bent part of the upper rim of the shrink film is slitted.

9. The packing of claim 7, wherein the bent part of the upper rim of the film strip is slitted.

10. The packing of claim 7, wherein the film strip is a strip of a heat-resistant plastic film.

11. The packing of claim 10, wherein the heat-resistant plastic film is made of polytetrafluoroethylene (PTFE film).

12. The packing of claim 7, wherein the film strip is a strip of an extruded film band with the upper rim being angled.

13. The packing of claim 12, wherein the angled upper rim of the film band and a remaining portion of the film band define an angle between 110 and 160°, wherein the angled upper rim defines about 20 to about 40% of an overall width of the film band.

14. The packing of claim 13, wherein the angle is 135°.

15. The packing of claim 1, wherein the shrink film is made of tetrafluoroethylene copolymer.

16. The packing of claim 1, wherein the shrink film is made of fluorinated ethylene propylene (FEP).

* * * * *